Patented Feb. 11, 1936

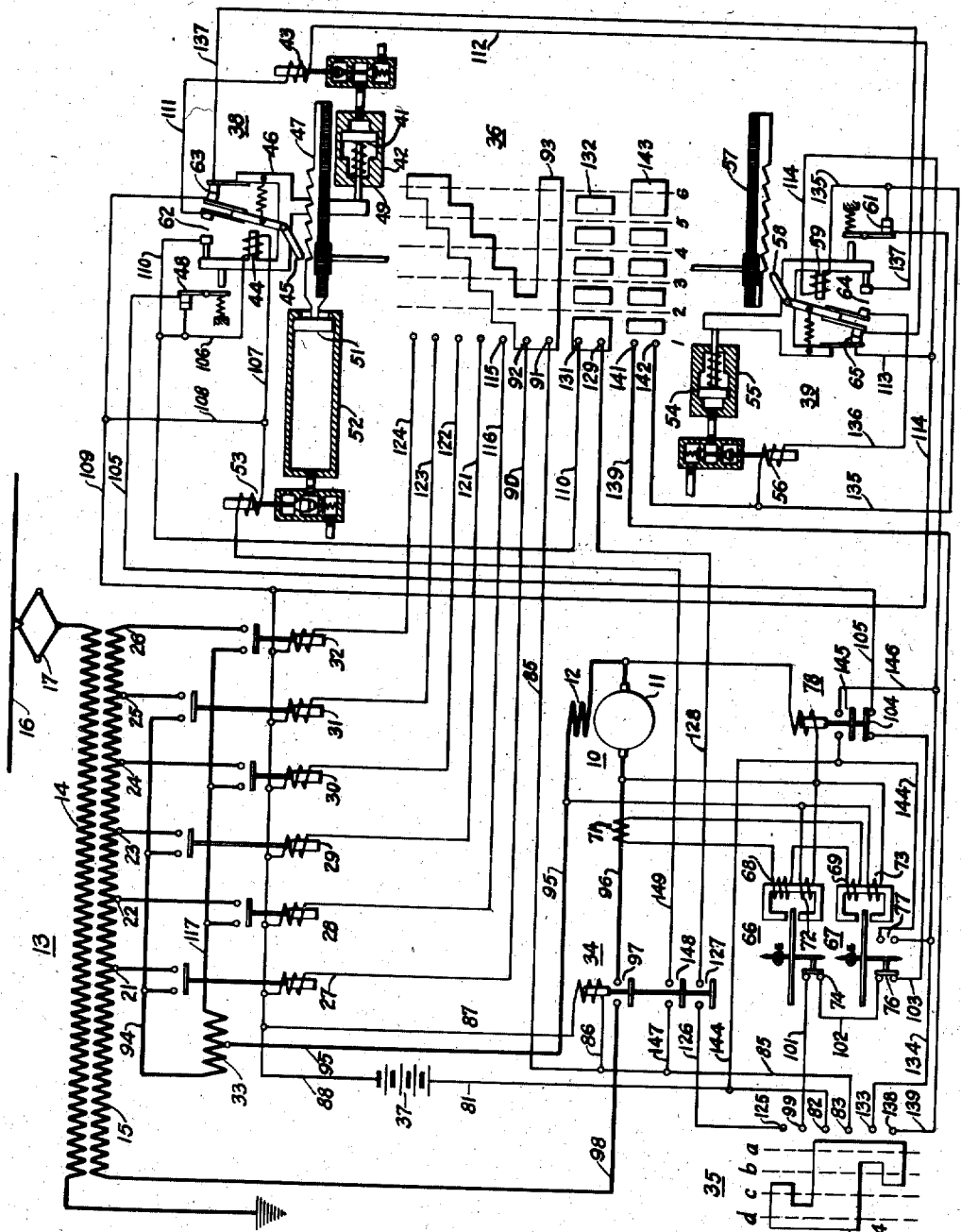

2,030,119

UNITED STATES PATENT OFFICE 2,030,119

CONTROL SYSTEM

Frank B. Powers, Forest Hills, and Charles C. Whittaker, Pittsburgh, Pa., assignors to Westinghouse Electric & Manufacturing Company, East Pittsburgh, Pa., a corporation of Pennsylvania Application June 9, 1934, Serial No. 729,808

9 Claims. (Cl. 172—179)

Our invention relates, generally, to control systems, and, more particularly, to systems for controlling the operation of electric locomotives or other electrically-propelled vehicles.

In order that full use may be made of the power which the motors on a locomotive are capable of developing it is necessary to be able to operate at all times at a load close to that corresponding to the point at which the overload-protection apparatus is set. However, it is important that the load current drawn by the motors should not be permitted to exceed the overload setting, which would result in the tripping of the protective apparatus and the disconnection of the motors from the power source.

It will be understood that it is difficult for an operator to so control the acceleration and operation of a locomotive that the motors will be operated at their maximum capacity at all times without exceeding this capacity, which results in the tripping of the overload-protection apparatus. Automatic accelerating systems have been devised in which the acceleration of a locomotive, or other electrically-propelled vehicle, is automatically controlled by a current limit relay, or similar apparatus. However, it is impossible to operate a locomotive at its maximum power at all times with previously known automatic control systems, as the motors cannot be consistently operated at maximum torque because of changing grade and adhesion conditions.

Also, in order to operate a locomotive, particularly one propelled by single-phase motors, most efficiently at high speeds, a constant horsepower characteristic should be followed instead of a constant current characteristic, as was the case with automatic accelerating systems controlled by current limit relays.

It is necessary to regulate an alternating current motor for constant wattage or horsepower instead of constant current in order to operate efficiently at high speeds since the iron losses in the motor increase with the speed of operation, thereby making it necessary to decrease the current in the motor at high speeds below the value that can be safely maintained at low speeds without overheating the motor. The losses in a motor resulting in heat which must be dissipated include both the $I^2R$ loss and the iron loss; accordingly, when the iron loss is high, as at high speeds, the current must be reduced in order to reduce the $I^2R$ loss to keep the total loss within a safe limit. Previously known automatic accelerating systems are, therefore, undesirable in that they operate the motors on a constant current characteristic.

An object of our invention, generally stated, is to provide a system for automatically controlling the operation of an electrically-propelled vehicle which shall be simple and efficient in operation and which may be economically manufactured and installed.

A more specific object of our invention is to provide for maintaining a substantially constant horsepower output from the propelling motors of an electric vehicle.

Another object of our invention is to provide a control system for operating the propelling motors of an electric vehicle at their rated power output without exceeding a predetermined power rating.

Other objects of our invention will be either explained fully hereinafter, or will be apparent to those skilled in the art.

According to the preferred embodiment of our invention the operation of the propelling motors of an electric vehicle is automatically controlled by a double-acting sequence drum that is both advanced and retracted step-by-step under the control of two limit relays of the wattmeter type, which cause the motors to operate on a constant horsepower characteristic.

For a fuller understanding of the nature and objects of our invention, reference may be had to the following detailed description, taken in conjunction with the accompanying drawing in which the single figure is a diagrammatic view of a locomotive control system embodying our invention.

Referring now to the drawing, a motor 10 is utilized for propelling an electric locomotive, or vehicle (not shown). The motor 10 may be of any type suitable for railway service, the one shown being of the single-phase alternating-current type, having an armature winding 11 and a series field winding 12. Power for operating the motor 10 is supplied from a transformer 13, having a primary winding 14 and a secondary winding 15. The transformer may be energized from a power conductor 16 through a pantograph collector 17.

In accordance with the usual practice in alternating-current railway systems, the motor 10 may be accelerated by increasing the voltage applied to the motor, step-by-step, by successively connecting the motor to taps 21 to 26, inclusive, provided on the secondary winding 15 of the transformer 13. A plurality of accelerating switches 27 to 32, inclusive, are provided for connecting the motor to the transformer taps. A preventive coil 33 is utilized for preventing the short circuiting of the transformer winding during the switching operations, in a manner well known in the art.

A line switch 34 is provided for connecting the motor 10 to the power source and a master controller 35 controls the operation of the line switch 34 and a sequence drum 36. The operation of the accelerating switches 27 to 32 is controlled by the sequence drum 36. A battery 37 provides energy for operating the control apparatus utilized in the system.

In order that the sequence drum 36 may be both advanced and retracted step-by-step, two notching mechanisms 38 and 39 are provided. The notching mechanisms 38 and 39 are of the type disclosed and claimed in the copending application of L. G. Riley, Serial No. 700,330, filed November 29, 1933, now Patent No. 1,987,709.

Inasmuch as the notching mechanisms are fully described in the foregoing application, it is believed to be unnecessary to describe them in detail in this application. Briefly, the mechanism 38 comprises a fluid-actuated piston 41 disposed inside of a cylinder 42, a magnet valve 43 for controlling the operation of the piston 41, an electro-magnet 44 and a pawl 45, both mounted on a frame 46 carried by the piston 41. When the magnet 44 is energized, the pawl 45 engages one of the teeth on a rack 47, which is disposed to drive the sequence drum 36. The frame 46 is actuated back and forth as the piston 41 operates in the air cylinder 42, therefore, the drum 36 may be advanced step-by-step by energizing the magnet 44 to cause the pawl 45 to engage the rack 47 and then admitting the pressure fluid to the cylinder 42 to operate the piston 41. A repeater switch 48 is operated at the end of each stroke of the piston 41 to deenergize the magnet 44 and the magnet valve 43, thereby permitting the piston 41 to be returned by a spring 49 located in the cylinder 42.

In order to quickly return the rack 47 and the drum 36 to the position shown in the drawing after it has been notched step-by-step to any desired position, one end of the rack 47 is attached to a piston 51, disposed in a fluid-pressure cylinder 52. The operation of the piston 51 is controlled by a magnet valve 53, which admits a pressure fluid to the cylinder 52 when the magnet valve is deenergized.

As shown, the notching mechanism 39, which is similar to the mechanism 38, is disposed to retract the sequence drum 36 step-by-step. The mechanism 39 comprises a piston 54 disposed in a cylinder 55, a magnet valve 56, a rack 57, a pawl 58, an electro-magnet 59 for actuating the pawl, and a repeater switch 61. The mechanisms 38 and 39 are provided with interlock switches 62 and 63 and 64 and 65, which are actuated by the electro-magnets of the respective mechanisms and control the magnet valves to prevent the two mechanisms from opposing each other, as will be more fully described hereinafter.

In order that the motor 10 may produce its maximium torque at all times without the motor current exceeding a safe value, two limit relays 66 and 67 are provided for controlling the operation of the sequence drum 36, which, in turn, controls the operation of the accelerating switches 27 to 32, inclusive. The relays 66 and 67 are provided with current coils 68 and 69, respectively, which are energized by a current transformer 71 connected in the motor circuit. The relays 66 and 67 are also provided with voltage coils 72 and 73, respectively, which are connected across the motor 10, thereby being energized in accordance with the voltage, and consequently, the speed of the motor. The relays may be so designed that above a predetermined motor voltage they will function as kilowatt, or horsepower, limit relays instead of current limit relays, thereby regulating for a constant horsepower instead of a constant current.

The relay 66 is so constructed and connected in the control system that it will operate to stop further progression of the sequence drum 36 at a predetermined power setting, and the relay 67 is so constructed that it will cause the sequence drum to be retracted if change in grade conditions cause the power required of the motor to be increased further, thereby preventing the motor from being operated above its rated capacity. The relay 66 is provided with contact members 74 and the relay 67 with contact members 76 and 77, which function to control the sequence drum 36, as will be more fully described hereinafter.

A slip or over-speed relay 78 may be connected across the armature 11 of the motor 10, as shown. The relay 78 functions to cause the sequence drum 36 to be notched back in the event that the wheels driven by the motor slip or if the motor operates at an excessive speed for any other reason. It will be understood that notching back or retracting the sequence drum operates the tap-changing switches 27 to 32, to decrease the voltage applied to the motor, thereby reducing its speed.

In order that the functioning of the foregoing apparatus may be better understood, the operation of the system will now be described. Assuming that it is desired to connect the motor 10 to the transformer 13 to accelerate the motor, the master controller 35 may be actuated to position "d", thereby closing the line switch 34. The energizing circuit for the actuating coil of the line switch 34 may be traced from the positive terminal of the battery 37 through conductor 81, contact fingers 82 and 83 bridged by a contact segment 84 of the master controller 35, conductor 85, conductor 86, the actuating coil of the line switch 34 and conductors 87 and 88 to the negative terminal of the battery 37.

At this time an energizing circuit is also established for the actuating coil of the accelerating switch 27. This circuit may be traced from the previously energized conductor 85 through contact fingers 91 and 92 bridged by a contact segment 93 of the sequence switch 36, conductor 90, the actuating coil of the switch 27 and conductor 88 to the negative terminal of the battery 37.

The closing of the switches 34 and 27 connects the motor 10 to the secondary winding 15, of the transformer 13, through a circuit which extends from the terminal 21 of the transformer 13 through the switch 27, conductor 94, a portion of the preventive coil winding 33, conductor 95, field winding 12, and the armature winding 11 of the motor 10, conductor 96, contact members 97 of the switch 34 and conductor 98 to the secondary winding 15 of the transformer 13.

When the controller 35 is on position "d", the notching mechanism 38 is energized to advance the sequence switch 36 step-by-step under the control of the limit relays 66 and 67 to accelerate the motor 10, the electro-magnet 44 and the magnet valve 43 being energized when the controller 35 is on position "d". The circuit for the electro-magnet 44 may be traced from a contact finger 99, which engages the contact segment 84, through conductor 101, the contact members 74 of the limit relay 66, conductor 102, the contact members 76 of the limit relay 67, conductor 103, contact members 104 of the overspeed relay 78, conductor 105, contacts on repeater switch 48, conductor 106, the coil of the magnet 44 and conductors 107, 108, 109 and 88 to the negative terminal of the battery 37.

As described hereinbefore, the pawl 45 is actuated to engage the teeth of the rack 47 when the magnet 44 is energized. Energizing the magnet 44 also closes the interlock switch 62 to establish an energizing circuit for the actuating coil of the magnet valve 43. This circuit may be traced from the previously energized conductor 106 through conductor 110, the interlock switch 62, conductor 111, the coil of the magnet valve 43, conductor 112, the interlock 65 on the notching mechanism 39, conductors 113, 114 and 88 to the negative terminal of the battery 37.

When the magnet valve 43 is energized, the piston 41 is operated to actuate the sequence switch 36 to position 2, thereby closing the switch 28 to increase the voltage applied to the motor 10. The energizing circuit for the switch 28 may be traced from a contact finger 115, which engages the contact segment 93, through conductor 116, the coil of the switch 28 and conductor 88 to the battery 37. The closing of the switch 28 connects the terminal 22 of the transformer winding 15, to conductor 117 and the preventive coil 33, thereby increasing the voltage applied to the motor 10 in a manner well known in the art.

As previously described, the repeater switch 48 is actuated at the end of each stroke of the piston 41 to deenergize the electro-magnet 44 and the magnet valve 43, thereby permitting the notching mechanism to be returned to the position shown in the drawing in order that the sequence drum 36 may be actuated another step. In this manner the sequence drum 36 is actuated step-by-step through positions 3, 4, 5 and 6 to energize the conductors 121, 122, 123 and 124, thereby closing the switches 29, 30, 31 and 32 to further increase the voltage applied to the motor 10, which will cause the motor to be accelerated.

However, the acceleration of the motor is at all times under the control of the limit relay 66, which is responsive to the power supplied to the motor since the relay is provided with a current coil 68 and a voltage coil 72, previously described. In the event that the power exceeds the setting of the relay 66, its contact members 74 are opened to interrupt the energizing circuit for the notching mechanism 38, thereby stopping the operation of the sequence drum 36 which prevents any further increase in the voltage applied to the motor 10 until the current in the motor circuit is reduced to a value which will permit the contact members 74 of the limit relay 66 to close.

As described hereinbefore, the operation of the slip or overspeed relay 78, which is connected across the armature of the motor 11 and is therefore responsive to its counter electro-motive-force, which in turn is proportional to the speed of the motor, will also stop the operation of the notching mechanism 38, as the opening of the contact members 104 of the relay 78 also interrupts the energizing circuit for the notching mechanism 38. In this manner excessive speed and slipping of the wheels driven by the motor 10 are prevented.

If desired, the operator may stop the operation of the notching mechanism 38 at any time during the accelerating period by actuating the controller 35 to position "c", thereby deenergizing the circuits through the electro-magnet 44 and the magnet valve 43. However, these units are not deenergized until the piston 41 has completed the stroke then in progress, thereby assuring that the sequence drum 36 will not be stopped on a mid-position. As shown, the conductor 110 which controls the energization of the magnet valve 43 and the electro-magnet 44 through circuits previously traced, is kept energized through a circuit which extends from a contact finger 125 of the controller 35, through conductor 126, an interlock 127 on the line switch 34, conductor 128 and contact fingers 129 and 131, which are bridged by one of the contact segments 132 while the sequence drum 36 is moving from one position to the next, thereby preventing the sequence drum from being stopped between positions.

As described hereinbefore, the sequence drum 36 may be retracted, step-by-step, in order to reduce the voltage applied to the motor 10. If it is desired to lower the motor voltage the master controller 35 may be actuated to position "a" which deenergizes the notching mechanism 38 and energizes the mechanism 39. When the controller 35 is on position "a", an energizing circuit is established for the electro-magnet 59 which may be traced from a contact finger 133 which engages the segment 84, through conductor 134, the repeater switch 61, conductor 135 the coil of the magnet 59 and conductors 114 and 88 to the negative terminal of the battery 37

At this time the actuating coil of the magnet valve 56 is energized through a circuit which extends from the previously energized conductor 135 through the coil of the magnet valve 56 conductor 136, the interlock switch 64, which is closed when the magnet 59 is energized, conductor 137, the interlock switch 63, which is closed when the magnet 44 of the notching mechanism 38 is deenergized and conductors 109 and 88 to the negative terminal of the battery 37. In this manner the sequence drum 36 may be retracted step-by-step by retaining the controller 35 on position "a".

If desired, the operator may stop the retraction of the sequence drum 36 and retain it on any desired position by moving the controller 35 to position "b", which deenergizes the magnet valve 56 and the electro-magnet 59. However, the piston 54 will complete the stroke then in progress before the mechanism is deenergized, since the conductor 135 is kept energized through a circuit which extends from a contact finger 138 on the controller 35, through conductor 139 and contact fingers 141 and 142, which are bridged by any one of the contact segments 143 while the sequence drum 36 is moving from one position to the next, thereby preventing the sequence drum from being stopped between positions.

As described hereinbefore, provision is also made for automatically retracting the sequence switch 36 at any time during the operation of the motor 10 in the event that the power supplied the motor 10 exceeds a predetermined limit. The automatic retraction of the sequence drum 36 is produced by the operation of the limit relay 67.

As shown, the contact members 77 of the relay 67 will be closed to energize the conductor in the event that the power supplied the motor 10 becomes sufficient to operate the relay 67, because of changing grade or load conditions. When the contact members 77 are closed, the conductor 134 is energized through a circuit which extends from the previously energized conductor 81 through conductor 144 and the contact members 77 to conductor 134. As previously described, the energization of the conductor 134 causes the notching mechanism 39 to retract the sequence switch 36 in the manner herein described.

The operation of the relay 78 as a result of overspeed or slip conditions will also cause the notching mechanism 39 to retract the sequence drum 36. In the event that the relay 78 is raised to its upper-most position, its contact members 145 establish a circuit for energizing the conductor 134, thereby operating the notching mechanism 39. This circuit may be traced from the previously energized conductor 144 through the contact members 145 and conductor 146 to the conductor 134.

Provision is also made for quickly returning the sequence drum 36 to position 1 in case the master controller 35 is actuated to the "off" position to disconnect the motor 10 from the power source, or in the event that the line switch 34 is automatically opened by the operation of an overload-trip device (not shown), in a manner well known in the art. The magnet valve 53 is of a type which admits the pressure fluid to the cylinder 52 to operate the piston 51 when the actuating coil of the valve is deenergized. It will be noted that the magnet valve 53 is energized when the master controller 35 is operated to close the line switch 34. The energizing circuit may be traced from the conductor 85 through conductor 147, and interlock 148 on the line switch 134, conductor 149, the actuating coil of the magnet valve 53 and conductors 107, 108, 109 and 88 to the negative terminal of the battery 81. Accordingly the magnet valve 53 is energized while the line switch 34 remains closed and the pressure fluid is not admitted to the cylinder 52. However, in the event that the line switch 34 is opened the magnet valve 53 is deenergized and the pressure fluid is readily admitted to the cylinder 52 which causes the piston 51 to quickly return the sequence drum 36 to the position shown in the drawing.

From the foregoing description it will be apparent that we have provided a system for automatically governing the acceleration of the propelling motors of a railway vehicle which controls the operation of the motors in accordance with the power required by them. The motors are automatically accelerated and decelerated under the control of limit relays which are responsive to the power supplied to the motors, thereby operating the motors on a constant horsepower characteristic. We have also provided for operating the motors at their normal power rating without permitting it to be exceeded as a result of changing grade or load conditions, which results in increased efficiency of operation. Furthermore, we have provided for automatically correcting for over-voltage and over-speed conditions, thereby preventing injury to the equipment on the locomotive.

We do not desire to be restricted to the specific embodiment of the invention herein shown and described, since it is evident that it may be changed and modified without departing from the spirit and scope of our invention as defined in the appended claims.

We claim as our invention:

1. In a motor control system, in combination, a motor, a source of power for the motor, means for automatically increasing the voltage applied to the motor step-by-step to accelerate the motor, means for automatically decreasing said applied voltage step-by-step, and means responsive to the power supplied to the motor for controlling the operation of said voltage applying means.

2. In a motor control system, in combination, a motor, a source of power for the motor, switching means for varying the voltage applied to the motor, means for automatically controlling the operation of said switching means, means for operating said controlling means to cause the voltage applied to the motor to be both increased and decreased step-by-step, and means responsive to the power supplied to the motor for governing the operation of said operating means.

3. In a motor control system, in combination, a motor, a source of power for the motor, switching means for carying the voltage applied to the motor, a sequence drum for automatically controlling the operation of said switching means, means for both advancing and retracting the sequence drum notch-by-notch to cause the voltage applied to the motor to be increased or decreased step-by-step, and relay means responsive to the current and the voltage supplied to the motor for governing the operation of the sequence drum.

4. In a motor control system, in combination, a motor, a source of power for the motor, switching means for varying the voltage applied to the motor, a sequence drum for automatically controlling the operation of said switching means, means for both advancing and retracting the sequence drum notch-by-notch to cause the voltage applied to the motor to be increased or decreased step-by-step, and means responsive to the power supplied to the motor for governing the operation of the sequence drum.

5. In a motor control system, in combination, a motor, a source of power for the motor, switching means for varying the voltage applied to the motor, a sequence drum for automatically controlling the operation of said switching means, a notching mechanism for advancing the sequence drum, a notching mechanism for retracting the sequence drum, and relay means responsive to the power supplied to the motor for governing the operation of the sequence drum.

6. In a motor control system, in combination, a motor, a source of power for the motor, switching means for varying the voltage applied to the motor, a sequence drum for automatically controlling the operation of said switching means, a notching mechanism for advancing the sequence drum, a notching mechanism for retracting the sequence drum, interlocking means for controlling the operation of the notching mechanisms, and relay means responsive to the power supplied to the motor for governing the operation of the sequence drum.

7. In a motor control system, in combination, a motor, a source of power for the motor, switching means for varying the voltage applied to the motor, a sequence drum for automatically controlling the operation of said switching means, a notching mechanism for advancing the sequence drum step-by-step, a relay responsive to the power supplied to the motor for controlling the operation of said notching mechanism, a second notching mechanism for retracting the sequence drum step-by-step, and a second relay responsive to the power supplied to the motor for controlling the operation of the second notching mechanism 8. In a motor control system, in combination, a motor, a source of power for the motor, switching means for varying the voltage applied to the motor, a sequence drum for automatically controlling the operation of said switching means, a notching mechanism for advancing the sequence drum step-by-step, a relay responsive to the power supplied to the motor for controlling the operation of said notching mechanism, a second notching mechanism for retracting the sequence drum step-by-step, a second relay responsive to the power supplied to the motor for controlling the operation of the second notching mechanism, and interlocking means actuated by the notching mechanism for preventing conflicting operation of said mechanisms.

9. In a motor control system, in combination, a motor, a source of power for the motor, switching means for varying the voltage applied to the motor, a sequence drum for automatically controlling the operation of said switching means, a notching mechanism for advancing the sequence drum step-by-step, a relay responsive to the power supplied to the motor for controlling the operation of said notching mechanism, a second notching mechanism for retracting the sequence drum step-by-step, a second relay responsive to the power supplied to the motor for controlling the operation of the second notching mechanism, and a relay responsive to the counter-electromotive force of the motor for controlling the operation of both of said notching mechanisms.

FRANK B. POWERS.
CHARLES C. WHITTAKER.

DISCLAIMER 2,030,119.—*Frank B. Powers*, Forest Hills, and *Charles C. Whittaker*, Pittsburgh, Pa. CONTROL SYSTEM. Patent dated February 11, 1936. Disclaimer filed April 14, 1937, by the assignee, *Westinghouse Electric & Manufacturing Company*.

Hereby enters this disclaimer to claims 1 to 6, inclusive, of the specification.
[*Official Gazette May 11, 1937.*]